April 14, 1936.  S. E. ALLEN  2,036,993
HITCH
Filed Oct. 10, 1935  2 Sheets-Sheet 2
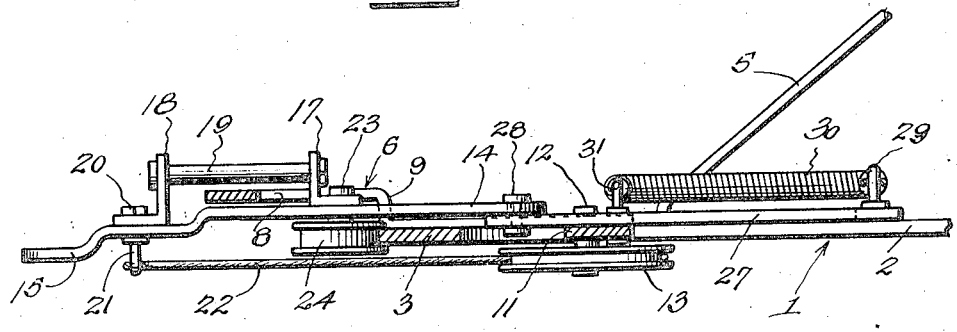
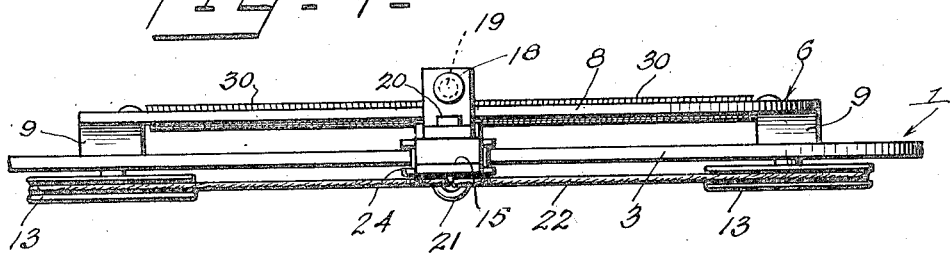
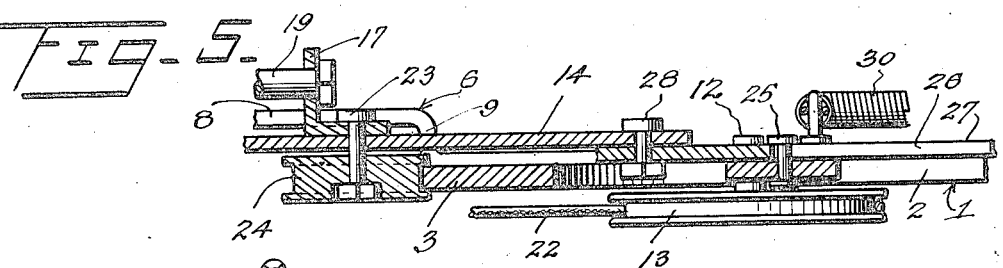
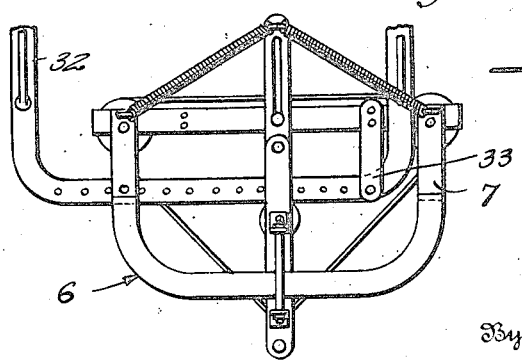
Inventor
S. E. Allen
By Watson E. Coleman
Attorney Patented Apr. 14, 1936

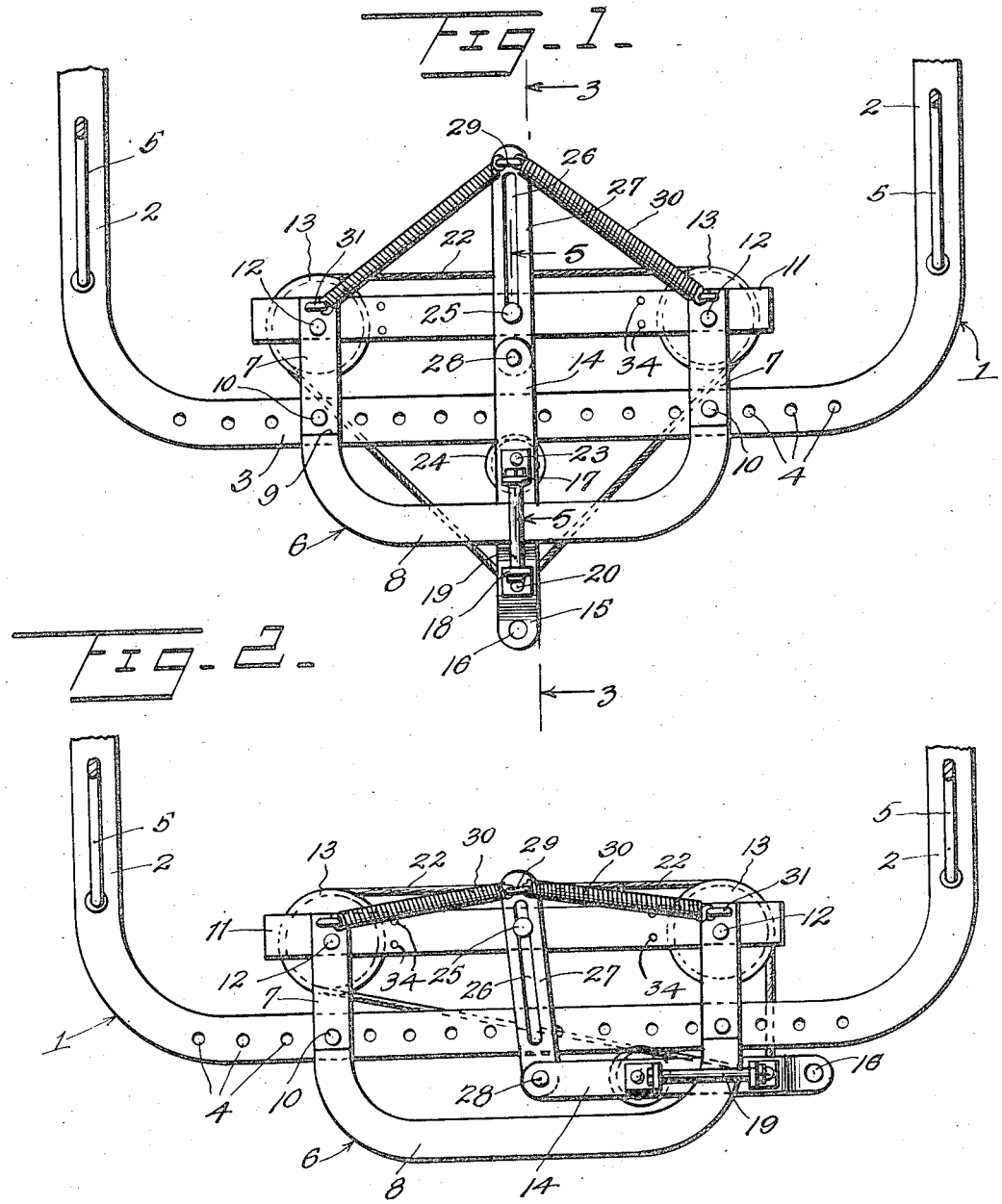

2,036,993

UNITED STATES PATENT OFFICE 2,036,993

HITCH

Sterling E. Allen, Long Pine, Nebr.

Application October 10, 1935, Serial No. 44,454

7 Claims. (Cl. 280—33.44)

This invention relates to the class of hitches and pertains particularly to an improved hitch for work machines of the nature of tractors.

The primary object of the present invention is to provide a tractor hitch which operates to permit the tractor to make a turn without losing traction or having to slow up its speed as a result of the weight or drag of the machine being towed.

Another object of the invention is to provide an improved tractor hitch which permits of the closer hitching or attaching of a trailing vehicle to the tractor or other machine drawing it, and which allows for a longitudinal extension or increase in the length of the hitch which permits turning without twisting or buckling the tongue of the drawn machine.

A further object of the invention is to provide a hitch having the foregoing features and which is relatively simple in construction and which is of a nature to be easily and quickly applied to or detached from the regular draw bar of a tractor.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 1 is a view in top plan of the hitch embodying the present invention showing the same applied to a tractor draw-bar.

Fig. 2 is a view similar to Fig. 1 but showing the disposition of the hitch parts while the tractor and trailing machine are making a turn.

Fig. 3 is a sectional view taken on the line 3—3 of Fig. 1.

Fig. 4 is a view in elevation of the hitch looking toward the rear of the same.

Fig. 5 is a section taken on the line 5—5 of Fig. 1.

Fig. 6 is a view illustrating the application of an extra bar to the hitch device.

Referring now more particularly to the drawings, wherein like numerals of reference indicate corresponding parts throughout the several views, the numeral 1 designates generally a draw-bar of the type found on certain standard makes of tractors. This draw-bar is in the form of a broad U having the side members 2 which parallel the sides of the tractor and the connecting yoke portion 3 which extends transversely thereof and which is provided with a plurality of apertures 4 through which the hitch bolt may be passed.

The numeral 5 designates brace members which extend from the rear ends of the side members 2 of the hitch upwardly to fixed parts of the tractor which are not illustrated.

The hitching mechanism embodying the present invention comprises a substantially U-shaped frame, indicated generally by the numeral 6 and having the sides 7 and the yoke 8 connecting the sides. The sides of this frame are offset at the points 9, so that when the frame is horizontally disposed the yoke portion 8 will be in a higher plane than the sides 7. The frame 6 is disposed with its side portions 7 extending across the yoke 3 of the hitch, and bolts 10 pass through apertures in the sides of the frame and through certain of the apertures to secure the frame in this position, as illustrated in Figs. 1 and 2.

Disposed between the yoke 3 and the tractor is a straight bar 11 which parallels the yoke 3 and which extends across the ends of the sides 7 of the hitch frame and is secured thereto by the bolts 12 which, in addition to serving as a means for coupling these parts together, constitute pivots for pulleys 13 which are disposed upon the underside of the bar 11 and lie in a plane beneath the yoke portion 3 of the draw-bar.

Disposed transversely of the yoke 3 is an oscillating tongue in the form of an elongated bar member 14 which, when the hitch parts are in normal position, that is, when the tractor and the machine being drawn are in tandem, extends across and at right angles to the yoke 3 and across the underside of and at right angles to the yoke portion 8 of the frame 6.

This tongue has a portion of its rear end offset to lie in a plane below the main body portion and substantially in the same plane as the yoke 3 of the draw-bar, as indicated at 15, and this part 15 is provided with an aperture 16 for the reception of a hitch bolt which may be employed for coupling the tongue with the tongue of the machine to be drawn.

Upon the top of the oscillating tongue 14 are the inner and outer brackets 17 and 18 respectively, between which are secured in spaced parallel relation with the tongue the roller bar 19 which extends across the yoke 8 of the frame. The bolt 20 which secures the bracket 18 to the tongue, extends through and is formed upon the underside of the tongue into an eye 21, to which the two ends of a cable 22 are attached. This cable extends from the eye to and across pulleys 13, thus normally forming a triangle therewith and with the eye 21, as shown in Fig. 1. At the forward end of the roller bar 19, the bolt 23 which secures the bracket 17 in place, passes through the tongue 14 and constitutes upon the underside of the tongue a pivot for a grooved roller 24 which receives in the groove of its periphery the rear edge of the yoke 3 of the tractor draw-bar.

At the central part of the fixed bar 11 is a guide pin 25 which passes through a slot 26 formed through and longitudinally of a sliding tongue 27 which extends over and rests upon the top of the bar 11. One end of this sliding tongue 27 is pivotally attached by the pin 28 to the other end of the oscillating tongue 14 while the opposite end of the sliding tongue 27 carries an eye bolt 29 to which is attached one end of each of two springs 30. These springs 30 extend rearwardly in divergent relation and each has its other end attached to an eye-bolt 31 which is secured in the rear end of a portion 7 of the U-frame 6.

Normally the hitch device will be disposed with its connected tongues 14 and 27 alined upon the longitudinal center of the tractor in the manner illustrated in Fig. 1, but if for any reason it is desired to offset the hitch, the bolts 10 may be removed and the frame 6 shifted to one side or the other, as will be readily apparent.

With the parts in position shown in Fig. 1, the tractor and the machine or machines being drawn thereby will be in tandem and the cable 22 will sustain the strain of pulling the trailing machines, the pull being transferred from the regular draw bar 1 through the arms or sides 7 of the frame 6 and the pulleys 13 to the cable and then to the tongue 14 and the draw-bar of the adjacent machine which is attached at the end of the tongue 14.

When a turn is being made, the parts will assume the positions illustrated in Fig. 2. When the turn is half completed, that is, when the tractor has made a complete 45° turn but the trailing machines are still directed forwardly and have yet to be turned as the tractor begins its turn, the tongue 14 will start to shift toward one side of the frame 6, the roller 24 moving along the rear edge of the yoke 3. This causes the cable 22 to shift so that the side of the triangle toward the direction of turn will be shortened while the opposite side will be lengthened and the sliding tongue 27 will shift rearwardly releasing or lightening up upon the tension of the springs 30. This causes a substantial lengthening or shifting rearwardly of the hitch connection so that the tractor can complete its turn without having to constantly exert a pull upon the trailing machinery. This permits the tractor to use its full power in turning, and after it has completed the turn or substantially done so, and is ready to proceed forwardly in a straight path, full power can be employed in swinging the trailing machines. As the trailing machines straighten out behind the tractor, the tongues 14 and 27 will swing back into their alined relation, as illustrated in Fig. 1, and the hitch connection will shorten up as the springs 30 assume their normal positions. When the hitch parts are as shown in Fig. 2, one of the springs will be under tension while the other will be substantially slack, but when the tongue is returned to normal position the two springs will be restored to the positions shown in Fig. 1 so that the tension of the two will be substantially the same.

When it is necessary to shift the hitch device to one side of the draw bar so as to make an offset hitch between the tractor and a piece of machinery, the hitch device 6 is shifted to one side upon the draw bar 1 as previously described, but in some tractors a narrow type of draw bar is employed such as is indicated by the numeral 32 in Fig. 6, and it then becomes necessary to add an extra element to properly stabilize the hitch device. Such an element is shown in Fig. 6 and indicated generally by the numeral 33. As illustrated, when the hitch is moved laterally upon the draw bar, one side 7 of the yoke 8 may lie outside the draw bar structure and the extra bar 33 is then disposed with one end over the yoke 3 of the draw bar while the other end is disposed over the bar 11 and bolts may then be passed through the extra bolt holes 34 formed in the bar 11 and through the adjacent end of the extra bar 33 and also through the other end of the bar 33 and one of the holes 4 in the yoke 3 of the draw bar. By this means the extended end of the bar 11 and the outer side of the hitch 6 will be securely coupled together so that the additional connection will not cause a twisting of or unnecessary strain upon the mechanism.

From the foregoing it will be apparent without the necessity of illustration that with the structure shown in Fig. 1 when the hitch unit 6 is shifted to one side, the extra bar 33 may be used to couple the bar 11 with the yoke 3 at the outer side of the hitch device so as to strengthen or make more rigid the connection between the hitch and the draw bar.

What is claimed, is:

1. A hitch for a vehicle having a draw-bar in the form of a wide U, comprising a tongue disposed across the yoke portion of said U, means carried by the tongue intermediate its ends providing a sliding contact with the bar, said tongue having an end adapted for connection with a trailing vehicle, a link pivotally coupled at one end with the other end of the tongue, means forming a sliding connection between the link and a fixed part of the structure on the side of the bar opposite the contact, and a flexible coupling between the said end of the tongue and the said fixed part of the structure.

2. A hitch for a vehicle having a draw-bar in the form of a broad U, comprising a frame mounted on the bar and having two portions transversely of the yoke thereof and a connecting portion between the two portions, a pair of pulleys each mounted on a vertical axis upon one of said portions, a tongue disposed normally transversely of the yoke of said bar, means coupling the tongue with the said connecting portion of the frame whereby movement of the tongue relative to said last portion is permitted, said tongue being adapted for connection at one end with a trailing vehicle, means coupled with the tongue at the other end for effecting its movement in a fixed path, and a cable passing about and connecting the pulleys and secured to the said connecting end of the tongue.

3. A hitch for vehicles having a draw-bar in the form of a wide U, comprising a U-frame having two sides disposed transversely of the yoke portion of the bar and a yoke connecting said sides and paralleling the bar yoke in spaced relation therewith, a pulley rotatably mounted on each of said sides upon the side of the bar yoke opposite from the frame yoke, a tongue member disposed across the frame yoke and having one end formed to facilitate attachment of a vehicle or machine thereto, a cable attached to said tongue adjacent said end and extending about and connecting said pulleys, the said cable forming a substantially triangular design when the tongue is in normal position transversely of the bar yoke, a roller carried by the tongue and having its periphery engaging an edge of the bar yoke, and means connected with the other end of said tongue for controlling the movement of the said other end when the tongue is shifted transversely of the said draw-bar.

4. A hitch for vehicles having a draw-bar in the form of a wide U, comprising a U-frame having two sides disposed transversely of the yoke portion of the bar and a yoke connecting said sides and paralleling the bar yoke in spaced relation therewith, a pulley rotatably mounted on each of said sides upon the side of the bar yoke opposite from the frame yoke, a tongue member disposed across the frame yoke and having one end formed to facilitate attachment of a vehicle or machine thereto, a cable attached to said tongue adjacent said end and extending about and connecting said pulleys, the said cable forming a substantially triangular design when the tongue is in normal position transversely of the bar yoke, a roller carried by the tongue and having its periphery engaging an edge of the bar yoke, means connected with the other end of said tongue for controlling the movement of the said other end when the tongue is shifted transversely of the said draw-bar, and an elongated roller mounted upon and extending longitudinally of the tongue and overlying the yoke of said frame to maintain the yoke in a prescribed relation with the frame.

5. A hitch for a vehicle having a draw-bar in the form of a wide U, comprising a substantially U-shaped frame having two side portions extending transversely of the yoke of said bar, and a yoke portion connecting said side portions and paralleling said bar yoke in spaced relation therewith, a fixed bar connecting said frame portions upon the side of the draw bar yoke opposite from the frame yoke, a pin carried centrally by the fixed bar, a pair of pulleys mounted upon the underside of the fixed bar adjacent an end of the latter and upon a vertical axis, a pair of tongues having adjacent ends pivotally connected together, one of said tongues being disposed across the fixed bar and having a longitudinal slot in which said pin engages, the other of said tongues extending across the yoke of the frame, an elongated roller carried by the said other tongue in spaced relation therewith and extending across the opposite side of the frame yoke from the tongue, a second roller carried by the said other tongue and having peripheral engagement with an edge of the draw-bar yoke, the said other tongue having its other end formed for attachment to a vehicle, a cable connected to the said other tongue and extending therefrom about and connecting said pulleys, and a pair of springs each connected at one end with the other end of the slotted tongue and having its other end secured to said fixed bar.

6. A hitch for a vehicle having a draw bar in the form of a horizontally disposed U, comprising a substantially U-shaped frame disposed horizontally upon said draw bar with its side portions extending transversely of the draw bar yoke, a pair of pulleys each mounted on a vertical axis adjacent the free end of each side of the frame, a rigid bar connecting the free ends of the frame and paralleling the draw bar yoke, a tongue disposed normally transversely of the yoke of said U frame, means coupling the tongue with said bar whereby movement of the tongue relative to the bar and the U frame is permitted, said tongue being adapted for connection at one end with a trailing vehicle, resilient means coupling the other end of the tongue with the bar for normally maintaining the tongue in a predetermined position, a cable passing about and connecting the pulleys and secured to the said one end of the tongue, and an auxiliary bar disposed transversely of said first bar and the yoke portion of said draw bar and secured thereto.

7. A hitch for coupling vehicles in tandem, comprising a bar carried by a leading vehicle, a draft tongue formed in two pivotally joined parts, one of said parts being disposed across said bar when the two parts are alined, means at the free end of the said one part for hitching a trailing vehicle thereto, means carried by the said one part having sliding contact with said bar, a cable forming a closed loop and joined to said one part adjacent said first means, a guide disposed laterally upon each side of the tongue and having the loop passing therearound, guide means for the other tongue part which is disposed between said guides, and a resilient coupling between the free end of the said other part and a fixed point laterally of and at each side of the tongue.

STERLING E. ALLEN.